United States Patent
Cunningham et al.

(10) Patent No.: US 9,541,237 B2
(45) Date of Patent: Jan. 10, 2017

(54) SYSTEM AND METHOD FOR GENERATING VACUUM FOR A VEHICLE

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 284 days.

(21) Appl. No.: 14/275,567

(22) Filed: May 12, 2014

(65) Prior Publication Data

US 2015/0323138 A1    Nov. 12, 2015

(51) Int. Cl.
| | |
|---|---|
| F25B 1/00 | (2006.01) |
| F17D 5/00 | (2006.01) |
| B60H 1/32 | (2006.01) |
| F02M 35/10 | (2006.01) |
| F02D 9/10 | (2006.01) |
| F02D 9/02 | (2006.01) |

(52) U.S. Cl.
CPC ............... *F17D 5/00* (2013.01); *B60H 1/3204* (2013.01); *F02D 9/1055* (2013.01); *F02M 35/10229* (2013.01); *F02D 2009/024* (2013.01); *F02D 2250/24* (2013.01); *F02D 2250/41* (2013.01); *Y10T 137/0379* (2015.04); *Y10T 137/86019* (2015.04)

(58) Field of Classification Search
CPC ......... F25B 41/062; F25B 1/10; B60H 1/3204
USPC ............................................. 62/243, 498, 115
See application file for complete search history.

(56) References Cited

U.S. PATENT DOCUMENTS

| | | | |
|---|---|---|---|
| 4,982,576 A * | 1/1991 | Proctor .............. | B60H 1/00585 62/195 |
| 8,302,417 B2 | 11/2012 | Major et al. | |

* cited by examiner

*Primary Examiner* — Melvin Jones
(74) *Attorney, Agent, or Firm* — Julia Voutyras; Alleman Hall McCoy Russell & Tuttle LLP

(57) ABSTRACT

Systems and methods for improving generation of vacuum for a vehicle are disclosed. In one example, an air conditioning compressor bypass valve is selectively activated to improve generation of vacuum by an engine. The systems and methods may reduce the possibility of compressor clutch degradation.

18 Claims, 5 Drawing Sheets

SYSTEM AND METHOD FOR GENERATING VACUUM FOR A VEHICLE

FIELD

The present description relates to systems and methods for generating vacuum for vacuum consumers of a vehicle. The systems and methods may be particularly useful for vehicles that operate at higher altitudes.

BACKGROUND AND SUMMARY

Vacuum may be used in a vehicle as a motive force for adjusting a position of actuators, assisting adjustment of an actuator, and/or as a way of transferring gases from one location to another location. For example, vacuum may assist a driver applying a vehicle's brake pedal or purging fuel vapors from a fuel vapor storage canister to an engine. One way to generate vacuum is to operate an engine throttled. At lower engine loads, the engine's throttle may be partially closed to reduce engine torque. Vacuum may be generated within the engine's air intake system at a location downstream of the throttle. Thus, the engine may be a cost effective way of producing vacuum. However, smaller displacement engines tend to operate at higher intake manifold pressure as compared to larger displacement engines. Additionally, when an engine is operated at higher altitudes, it may be more difficult for the engine to produce vacuum since air pressure at higher altitudes is reduced as compared to air pressure at sea level. Consequently, an engine may operate less throttled at higher altitudes to produce a same amount of torque as at a lower altitude. Therefore, it may be more difficult to produce vacuum via the engine at higher altitudes.

One way of generating additional vacuum at higher altitudes is to reduce a load applied to the engine when the engine is operated at higher altitudes. However, it may not be possible or desirable to reduce a load applied to an engine every time vacuum is requested without degrading operation of the device providing load to the engine. As a result, the engine may produce lower vacuum than is desired, or vehicle passengers may become aggravated by degraded performance of subsystems that are unloaded from the engine for extended periods to improve vacuum generation.

The inventors herein have recognized the above-mentioned disadvantages and have developed a method for generating vacuum, comprising: operating an air conditioning compressor bypass valve to reduce air conditioner compressor work in response to a request to reduce air conditioner compressor load for less than a predetermined amount of time.

By opening an air conditioning compressor bypass valve in response to a request for vacuum, it may be possible to provide the technical result of producing vacuum for vehicle systems in a way that is less noticeable to vehicle occupants. In particular, an air conditioning compressor bypass valve may be opened for short time periods (e.g., less than five seconds) to unload the air conditioning compressor from the engine. Thus, the air conditioning compressor may be unloaded from the engine for short periods of time so that vacuum in a vacuum reservoir may be replenished. Additionally, opening the air conditioning compressor bypass clutch allows an air conditioning compressor clutch to remain closed so that there may be less possibility of air conditioning clutch degradation.

The compressor bypass valve may be opened asynchronously with respect to instantaneous compressor piston position. For example, the compressor bypass valve may be opened when a piston of the air conditioning compressor is at any position in its cycle. However, in other examples, the compressor bypass valve (or valves) may be opened and closed in synchronism with piston position and thus continuously vary the "trapped" vapor to be compressed. For example, the compressor bypass valve may be opened during each compression stroke of the compressor piston ten degrees before top-dead-center (TDC) compression stroke. If the air conditioning compressor includes multiple pistons, the compressor bypass valve may be opened and closed synchronous with the different pistons. The compressor bypass valve opening and closing may be synchronous controlled to vary the air conditioning compressor between full compression and no (or low) compression.

The present description may provide several advantages. Namely, the approach may improve vacuum generation for a vehicle. Additionally, the approach may reduce the possibility of air conditioning clutch degradation. Further, the approach may reduce vehicle passenger discomfort by reducing air conditioning compressor load on an engine for short intervals during which a reduction in air conditioning system output may be less noticeable.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
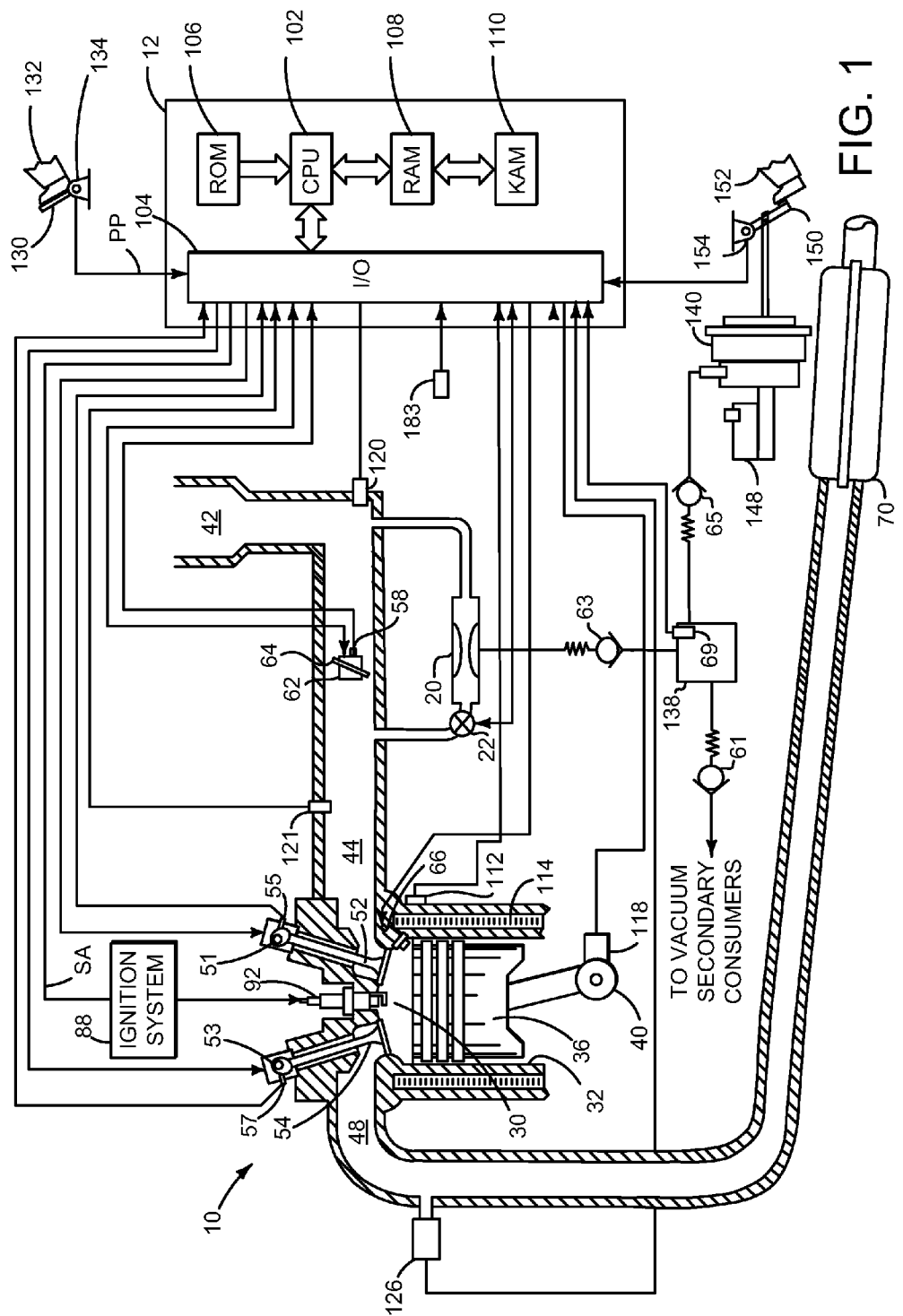
FIG. 1 is a schematic diagram of an engine for generating vacuum.
Figure 2:
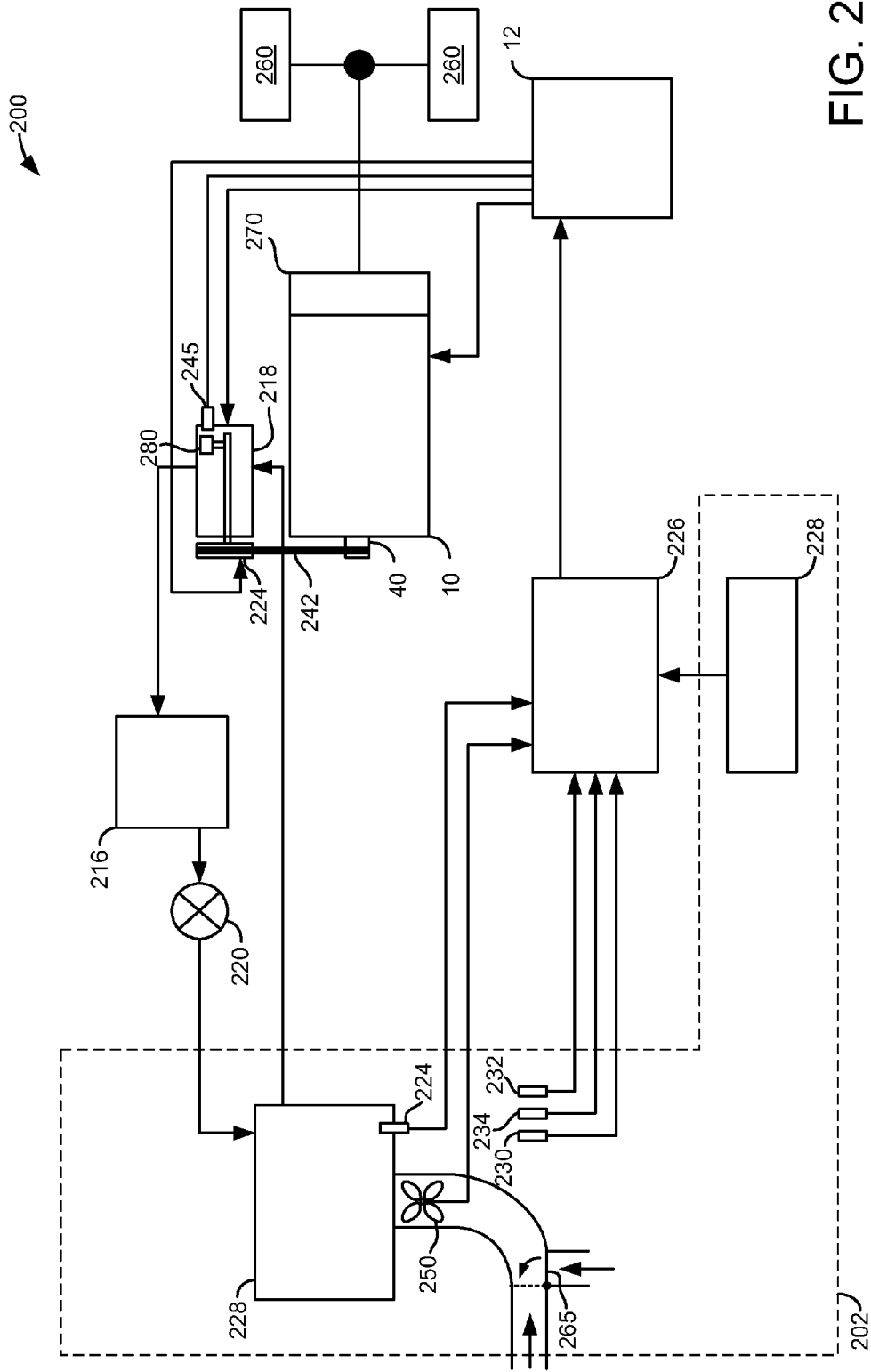
FIG. 2 is a schematic diagram of a vehicle air conditioning system.
Figure 4:
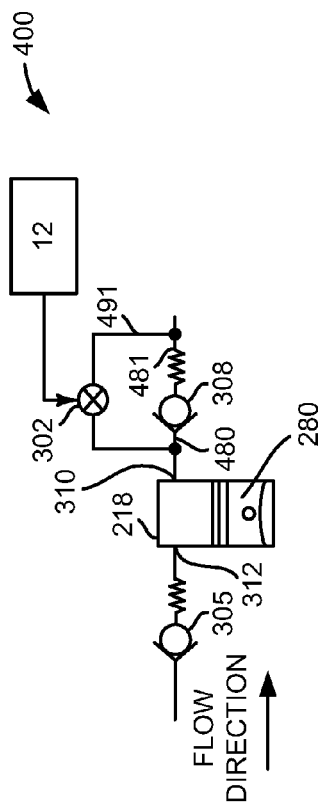
FIGS. 3-4 are schematic diagrams of air conditioning compressor bypass passages.
Figure 3:
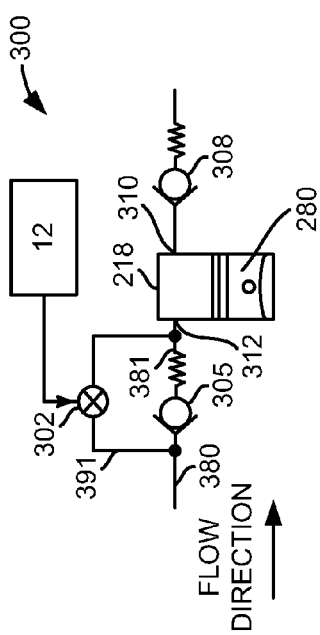
Figure 5:
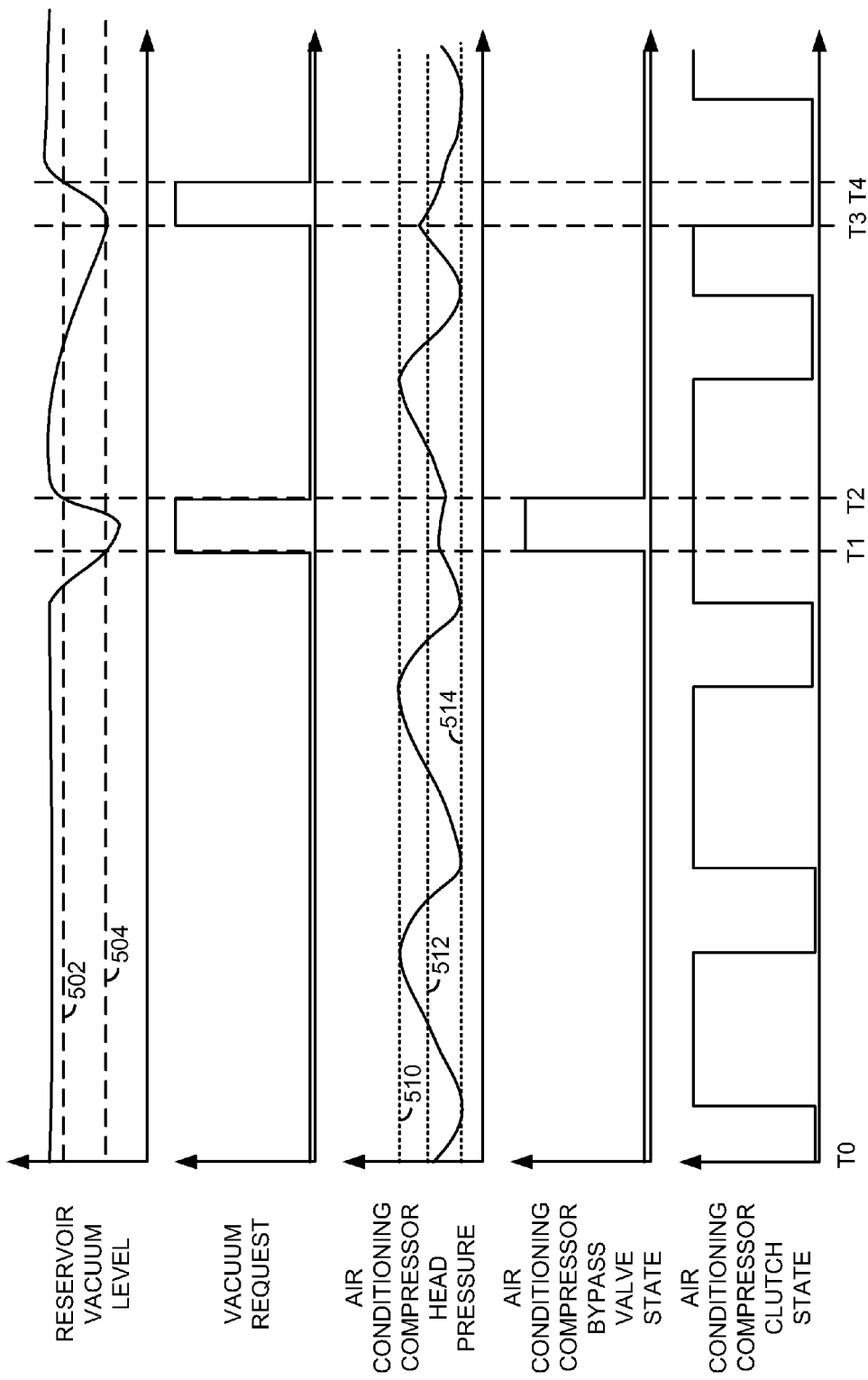
FIG. 5 is simulated operating sequences for the systems of FIGS. 1-4 according to the method of FIG. 6.

The present description is related to providing vacuum to a vehicle. Vacuum is provided by an engine to a vacuum reservoir as shown in FIG. 1. The engine may be included in a vehicle that includes an air conditioning system as shown in FIGS. 2-4. The air conditioning system may be operated as shown in the sequence of FIG. 5 to improve vacuum generation within an engine. The method of FIG. 6 describes a way of controlling load applied to an engine so that the engine may provide vacuum while at the same time reducing the possibility of aggravating passengers due to loss of operation of vehicle systems while generating vacuum.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from engine intake 42.

Vacuum reservoir 138 may be supplied vacuum via ejector 20. Ejector vacuum flow control valve 22 may be opened to permit air from engine intake 42 to pass through ejector 20. Air may pass through ejector 20 and create a low pressure region within ejector 20, thereby providing a vacuum source for vacuum reservoir 138. Air flowing through ejector 20 is routed to intake manifold 44 downstream of throttle 62. Check valve 63 ensures air does not pass from ejector 20 to vacuum reservoir 138.

While ejector 20 is useful for increasing intake manifold vacuum and increasing vacuum level, it may not have capacity to provide as much vacuum as is desired in a short amount of time. Further, the performance of ejector 20 may be reduced during times when accelerator pedal 130 is not depressed or when engine torque demand is low since vacuum provided by ejector 20 increases as air flow through ejector 20 increases. Consequently, it may be desirable to increase intake manifold vacuum via a plurality of control actions including reducing and/or eliminating creep torque while providing vacuum via ejector 20. In this way, ejector 20 may provide even deeper vacuum to the vehicle vacuum system.

Vacuum reservoir 138 provides vacuum to brake booster 140 via check valve 65. Vacuum reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 limits air flow from vacuum reservoir 138 to secondary vacuum consumers (e.g., vacuum consumers other than the vehicle braking system). Brake booster 140 may include an internal vacuum reservoir, and it may amplify force provided by foot 152 via brake pedal 150 to master cylinder 148 for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; an engine position sensor from a Hall effect sensor 118 sensing crankshaft 40 position; a measurement of air mass entering the engine from sensor 120 (e.g., a hot wire air flow meter); a measure or level of vacuum in vacuum reservoir 138 via vacuum or pressure sensor 69; and a measurement of throttle position from sensor 58. Barometric pressure may also be sensed via sensor 183 for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, air conditioning system 200 includes an evaporator 228 for cooling vehicle cabin air. Air is passed over evaporator 228 via fan 250 and directed around vehicle cabin 202. Climate controller 226 operates fan 250 according to operator settings as well as climate sensors. Temperature sensor 224 provides an indication of the temperature of evaporator 228 to climate controller 226. Cabin temperature sensor 230 provides an indication of cabin temperature to climate controller 226. Similarly, humidity sensor 232 provides climate controller 226 an indication of cabin humidity. Sun load sensor 234 provides an indication of cabin heating from sun light to climate controller 226. Climate controller 226 also receives operator inputs from operator interface 228 and supplies desired evaporator temperature and actual evaporator temperature to engine controller 12.

Operator interface 228 allows an operator to select a desired cabin temperature, fan speed, and distribution path for conditioned cabin air (e.g., conditioned fresh air or conditioned recirculated air). Operator interface 228 may include dials and push buttons to select climate settings. In some examples, operator interface 228 may accept inputs via a touch sensitive display.

Refrigerant is supplied to evaporator 228 via evaporator valve 220 after being pumped into condenser 216. Compressor 218 receives refrigerant gas from evaporator 228 and pressurizes the refrigerant. Heat is extracted from the pressurized refrigerant so that the refrigerant is liquefied at condenser 216. The liquefied refrigerant expands after passing through evaporator valve 220 causing the temperature of evaporator 228 to be reduced.

Compressor 218 includes a clutch 224 and a piston 280. Piston 280 pressurizes refrigerant in air conditioning system 200 which flows from air conditioning compressor 218 to condenser 216. Pressure sensor 245 senses air conditioning compressor head pressure. Clutch 224 may be selectively engaged and disengaged to supply air conditioning compressor 218 with rotational energy from engine 10. In one example, engine 10 supplies rotational energy to compressor 218 and wheels 260 via transmission 270. Rotational energy may be supplied to air conditioner compressor 218 from engine 10 via belt 242. In one example, belt 242 mechanically couples crankshaft 40 to climate control compressor 218 via clutch 224.

In this way, the system of FIG. 2 provides rotational energy to a climate control compressor to cool the cabin of a vehicle. Specifically, the air conditioning compressor provides a negative torque to load the engine and compress the refrigerant so that the refrigerant can be subsequently expanded in order to cool the vehicle cabin. The amount of negative torque provided to the engine by the air conditioner compressor can be adjusting via the clutch and an actuator or valve that adjusts the variable displacement pump. The negative torque supplied to the engine via the air conditioning compressor may be removed via clutch 224.

Referring now to FIG. 3, a first example air conditioning compressor system 300 is shown. Air conditioning compressor system 300 includes an electrically operated air conditioning compressor bypass valve 302, first check valve 305, second check valve 308, compressor 218, and piston 280. Refrigerant passes through compressor 218 in the direction indicated. In this example configuration, electrically operated air conditioning compressor bypass valve 302 is positioned at inlet 312 of compressor 218 straddling check valve 305. Thus, bypass valve 302 is positioned in passage 391 linking check valve inlet 380 to check valve outlet 381. The air conditioning compressor may have multiple pistons operating out of phase with respect to other air conditioning compressor pistons. In such case, each piston has its own inlet check valve and outlet check valve and thus would need a multiplicity of bypass valves to deactivate, for example, all the inlet check valves.

Check valve 305 is bypassed when electrically operated air conditioning compressor bypass valve 302 is adjusted to an open position. Bypassing check valve 305 allows refrigerant to be pumped back and forth through electrically operated air conditioning compressor bypass valve 302 via piston 280, thereby reducing pumping work of compressor 218. A closing spring force of check valve 308 is not overcome by compressor 218 when electrically operated air conditioning compressor bypass valve 302 is in an open state. Consequently, refrigerant pressure does not build at outlet 310 of compressor 218. Controller 12 may selectively operate electrically operated air conditioning compressor bypass valve 302 based on vehicle operating conditions including a vacuum level within vacuum reservoir 138 shown in FIG. 1.

A solenoid-operated plunger which props open the check valve is functionally equivalent to a valve plumbed in parallel to the check valve. And, in some examples, the solenoid-operated plunger may be configured to implement the system.

Referring now to FIG. 4, an alternative air conditioning compressor system 400 is shown. Components of air conditioning compressor system 400 that have the same numerical identifiers as components in air conditioning compressor system 300 are the same components and operate the same except as indicated. Therefore, for the sake of brevity, a description of each system component is omitted.

In this example, air conditioning compressor system, electrically operated air conditioning compressor bypass valve 302 is positioned at outlet 319 of compressor 218 straddling check valve 308. Thus, bypass valve 302 is positioned in passage 491 linking check valve inlet 480 to check valve outlet 481.

Check valve 308 is bypassed when electrically operated air conditioning compressor bypass valve 302 is adjusted to an open position. Bypassing check valve 308 allows refrigerant to be pumped back and forth through electrically operated air conditioning compressor bypass valve 302 via piston 280, thereby reducing pumping work of compressor 218. Additional refrigerant does not flow into compressor 218 via check valve 305 since closing spring force of check valve 305 is not overcome by compressor 218 when electrically operated air conditioning compressor bypass valve 302 is in an open state. Consequently, refrigerant pressure does not lower at inlet 312 of compressor 218. Controller 12 may selectively operate electrically operated air conditioning compressor bypass valve 302 based on vehicle operating conditions including a vacuum level within vacuum reservoir 138 shown in FIG. 1.

Thus, the system of FIGS. 1-4 provides for a system for generating vacuum, comprising: an engine including an intake manifold; an air conditioning compressor; a first check valve at an inlet of the air conditioning compressor; a second check valve at an outlet of the air conditioning compressor; an air conditioning compressor clutch selectively coupling the engine and the air conditioning compressor; and an electrically operated air conditioning compressor bypass valve located at the inlet or outlet of the air conditioning compressor. The system further comprises a controller and executable instructions stored in non-transitory memory for operating the electrically operated air conditioning compressor bypass valve in response to a vacuum level of a vacuum reservoir. The system further comprises an air conditioning compressor clutch and additional executable instructions for opening the air conditioning compressor clutch in response to a vacuum level stored in a vacuum reservoir.

In some examples, the system further comprises additional instructions for not closing the air conditioning compressor clutch for a predetermined amount of time since the air conditioning compressor clutch has opened. The system includes where the electrically operated air conditioning compressor bypass valve is located in a passage linking an inlet of the first check valve and an outlet of the first check valve. The system also includes where the electrically operated air conditioning compressor bypass valve is located in a passage linking an inlet of the second check valve and an outlet of the second check valve.

Figure 6:
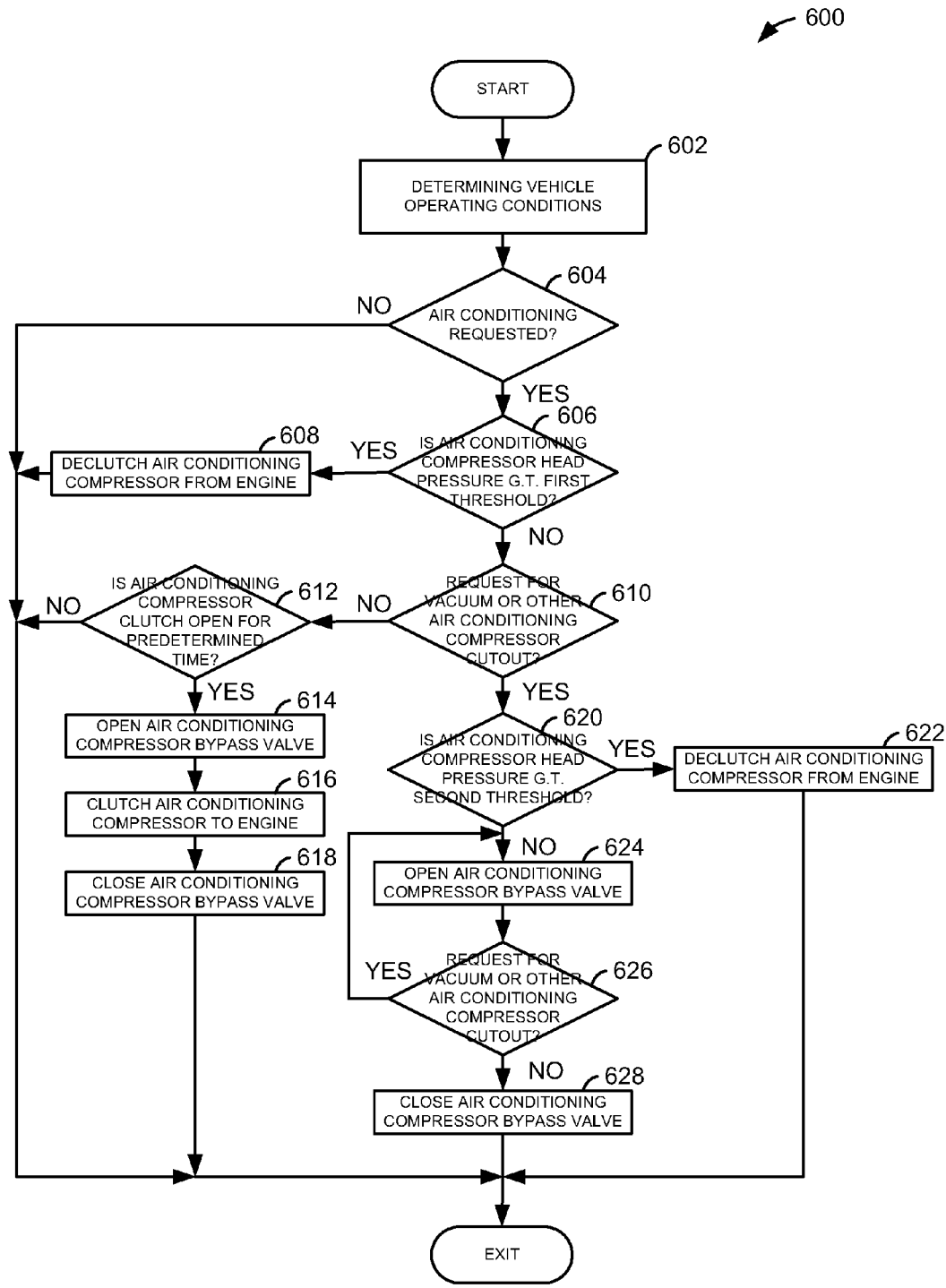
FIG. 6 is a method for supplying vacuum for a vehicle.

Referring now to FIG. 5, a simulated operating sequence for the system of FIGS. 1-4 according to the method of FIG. 6 is shown. Vertical markers T0-T4 indicate times of interest during the sequence.

The first plot from the top of FIG. 5 is a plot of vacuum reservoir vacuum level versus time. The vacuum reservoir may be coupled to an engine intake manifold via an ejector as shown in FIG. 1 or directly to the engine intake manifold via a check valve. The Y axis represents vacuum and vacuum increases (e.g., pressure decreases) in the direction of the Y axis arrow. The X axis represents time and time increases from the left side of FIG. 5 to the right side of FIG. 5. Horizontal line 502 represents an upper vacuum level threshold where vacuum is not requested (e.g., the vacuum request is not asserted) once vacuum in the vacuum reservoir is greater than the level of line 502. Horizontal line 504 represents a lower vacuum level threshold where vacuum is requested (e.g., the vacuum request is asserted) once vacuum in the vacuum reservoir is lower than the level of line 504.

The second plot from the top of FIG. 5 is a plot of a vacuum request versus time. The vacuum request may be provided when vacuum stored within the vacuum reservoir is less than a threshold vacuum level. The vacuum request is asserted when the vacuum trace is at a higher level (e.g., near the Y axis arrow). The vacuum request is not asserted when the vacuum trace is at a lower level (e.g., near the X axis).

The third plot from the top of FIG. 5 is a plot of air conditioning compressor head pressure versus time. Air conditioning compressor outlet pressure may be referred to as head pressure. Air conditioning compressor head pressure increases in the direction of the Y axis arrow. The X axis represents time and time increases from the left side of FIG. 5 to the right side of FIG. 5. Horizontal line 510 represents an upper air conditioning compressor head temperature where an air conditioning clutch is opened to limit air conditioning compressor head pressure. Horizontal line 512 represents an air conditioning compressor head pressure below which an air conditioning compressor bypass valve may be activated to lower air conditioning compressor load on an engine in response to a request for vacuum. At air conditioning compressor head pressures above line 512, the air conditioning compressor clutch may be opened to reduce load on an engine in response to a request for vacuum. Horizontal line 514 represents an air conditioning compressor head pressure at which the air conditioning compressor clutch may be activated after the air conditioning compressor clutch was opened in response to a higher air conditioning compressor head pressure while air conditioning is requested.

The fourth plot from the top of FIG. 5 is a plot of air conditioning compressor bypass valve state versus time. The air conditioning compressor bypass valve state is asserted (e.g., the trace is at a higher level) to open the air conditioning compressor bypass valve and reduce air conditioning compressor work. The air conditioning compressor bypass valve state is not asserted (e.g., the trace is at a lower level) to close the air conditioning compressor bypass valve and increase air conditioning compressor work.

The fifth plot from the top of FIG. 5 is a plot of air conditioning compressor clutch state versus time. The air conditioning compressor clutch state is asserted (e.g., closed) when the air conditioning compressor clutch state is at a higher level (e.g., near the Y axis arrow). The air conditioning compressor clutch state is not asserted (e.g., open) when the air conditioning compressor clutch state trace is at a lower level (e.g., near the X axis).

At time T0, the vacuum reservoir vacuum level is elevated to above level 502 indicating that there is a high level of vacuum in the vacuum reservoir. The vacuum request is not asserted since the vacuum level of the vacuum reservoir is at a higher level. The air conditioner compressor head pressure is decreasing as refrigerant in the air conditioning system cools ambient air and loses pressure. The air conditioning compressor bypass valve state is not asserted since the vacuum reservoir vacuum level is high. Additionally, the air conditioning compressor clutch state is at a lower level indicating that the air conditioning clutch is open. The air conditioning clutch was previously opened in response to the air conditioning compressor head pressure exceeding level 510.

Between time T0 and time T1, the vacuum reservoir vacuum level remains elevated and the vacuum request is not asserted. The air conditioning compressor head pressure cycles up and down in response to the air conditioning compressor clutch cycling on and off. The air conditioning compressor clutch is off (e.g., at a lower level) when air conditioning compressor head pressure reaches level 510. The air conditioning compressor clutch is on (e.g., at a higher level) when air conditioning compressor head pressure decays to level 514.

At time T1, the vacuum reservoir vacuum level has been reduced to level 504 in response to vacuum consumers using vacuum. The vacuum request is asserted in response to the vacuum level in the vacuum reservoir being reduced to level 504. The air conditioning compressor bypass valve is commanded to an open state in response to the vacuum request and air conditioning compressor head pressure being less than level 512. The air conditioning compressor head pressure begins to slowly decay since air conditioning compressor work is reduced by opening the air conditioning compressor bypass valve. The air conditioning compressor clutch remains closed since air conditioning compressor head pressure is less than level 510.

At time T2, vacuum reservoir vacuum has increased to level 502 via air being pumped from the vacuum reservoir to the engine intake manifold. The vacuum request transitions to a lower level in response to the higher vacuum reservoir vacuum to indicate that additional vacuum is not requested. The air conditioning compressor head pressure beings to increase in response to the air conditioning compressor bypass valve state transitioning to a lower level where the bypass valve is closed. The air conditioning compressor clutch remains in a closed state allowing the engine to rotate the air conditioning compressor to increase compressor output pressure.

Between time T2 and time T3, the vacuum reservoir vacuum level remains elevated and then begins to decay near time T3. The vacuum request is not asserted and the air conditioning compressor head pressure cycles up and down in response to the air conditioning compressor clutch cycling on and off based on air conditioning compressor pressure cycling between level 510 and level 514. The air conditioning compressor bypass valve remains not asserted (e.g., closed) so that the air conditioning compressor is not bypassed.

At time T3, the vacuum reservoir vacuum level is reduced to less than level 504. The vacuum request is asserted in response to the vacuum reservoir level being less than level 504. However, the air conditioning compressor head pressure is greater than level 512 so the air conditioning compressor bypass valve state remains at a lower level where the air conditioning compressor bypass valve is not opened. Instead, the air conditioning compressor clutch is opened in response to the vacuum request and air conditioning compressor head pressure being greater than level 512. Opening the air conditioning clutch decouples the air conditioning compressor from the engine allowing the engine to operate with a lower engine air amount to provide a same torque. Consequently, the engine may produce additional vacuum. The vacuum reservoir vacuum level begins to increase after the air conditioning clutch is opened.

At time T4, the vacuum level in the vacuum reservoir has increased to a level greater than level 502 as the engine pumps air from the vacuum reservoir into the intake manifold. The vacuum request transitions to a lower level in response to the vacuum level exceeding level 502. The air conditioning compressor bypass valve state remains at a lower level where the air conditioning compressor bypass valve is closed and the air conditioning compressor clutch state does not change until the air conditioning compressor head pressure is less than threshold 514.

In this way, it is possible to reduce air conditioning compressor work and torque applied to the engine by opening a bypass valve or a clutch. Further, by selecting to open the bypass valve or clutch based on air conditioning compressor head pressure, it may be possible to reduce air conditioning compressor clutch degradation.

Referring now to FIG. 6, a method for supplying vacuum for a vehicle is shown. The method of FIG. 6 may be incorporated into the system of FIGS. 1-4 as executable instructions stored in non-transitory memory. Further, the method of FIG. 6 may provide the operating sequence shown in FIG. 5.

At 602, method 600 determines operating conditions. Operating conditions may include but are not limited to air conditioning compressor head pressure, vacuum level stored in vacuum reservoir, air conditioning request state, and air conditioning clutch state. Method 600 proceeds to 604 after operating conditions are determined.

At 604, method 600 judges if air conditioning is requested. In one example, air conditioning may be determined to be requested based on an input from an air conditioning system switch or user interface. If the input is asserted (e.g., a digital level one), the answer is yes and method 600 proceeds to 606. Otherwise, the answer is no and method 600 proceeds to exit.

At 606, method 600 judges if air conditioning compressor head pressure is greater than (G.T.) a first threshold pressure. In one example, the first threshold pressure is an upper limit pressure. If method 600 judges that air conditioning compressor head pressure is greater than the first threshold pressure, the answer is yes and method 600 proceeds to 608. Otherwise, the answer is no and method 600 proceeds to 610.

At 608, method 600 opens the air conditioning compressor clutch to declutch the air conditioning compressor from the engine. Opening the air conditioning compressor clutch reduces the load the compressor applied to the engine and removes the power source from the compressor piston to deactivate the compressor. Air conditioning compressor head pressure is reduced after the air conditioning compressor clutch is opened since the compressor is not operating and since the compressed refrigerant is used to cool passenger cabin air. Additionally, the air conditioning system transitions into recirculation mode (e.g., air external to the passenger cabin is not cooled and circulated in the passenger cabin or the amount of external air is reduced and the amount of passenger cabin air recirculated is increased) from non-recirculation mode (e.g., air external to the passenger cabin is cooled and circulated in the passenger cabin) in response to opening the air conditioning clutch. In this way, cooling the vehicle interior may be extended and a change in interior humidity may be less evident. Method 600 proceeds to exit after the air conditioning compressor clutch is opened.

At 610, method 600 judges if there is a request for vacuum or some other request to cut out the air conditioning compressor. A vacuum request may be generated in response to a vacuum level stored in a vacuum reservoir being less than a threshold level. Other request for cutting out the air conditioning compressor may include but are not limited to vehicle acceleration being less than a threshold acceleration, a change in requested engine torque being greater than a threshold, the engine operating in idle speed control mode, and the air conditioning load being at a high level where it may not be desirable to reduce air conditioning compressor output for more than a threshold amount of time (e.g., 5 seconds). If method 600 judges that a request for vacuum or other request for air conditioning compressor cut out is present, the answer is yes and method 600 proceeds to 620. Otherwise, the answer is no and method 600 proceeds to 612.

At 612, method 600 judges if the air conditioning compressor clutch has been open for a predetermined amount of time (e.g., 5 seconds). In one example, method 600 may start a timer when the air conditioning compressor clutch is opened to determine how long the air conditioning clutch has been opened. It may be desirable for the air conditioning compressor clutch to be opened for at least the predetermined amount of time before closing the air conditioning compressor clutch to reduce clutch degradation. In this way, the air conditioning compressor clutch duty cycle may be reduced. If method 600 determines that the air conditioning compressor clutch has been open for the predetermined amount of time, the answer is yes and method 600 proceeds to 614. Otherwise, the answer is no and method 600 proceeds to exit.

At 614, method 600 opens the air conditioning compressor bypass valve. By opening the air conditioning compressor bypass valve, the air conditioning compressor clutch may be closed so that little load is applied to the engine by the air conditioning compressor, thereby reducing frictional forces on the air conditioning compressor clutch during clutch closing. Method 600 proceeds to 616 after the air conditioning compressor bypass valve is opened.

At 616, method 600 closes the air conditioning compressor clutch. Closing the air conditioning compressor clutch mechanically couples the air conditioning compressor to the engine. The clutch may be an electromechanical clutch. Method 600 proceeds to 628 after the clutch is closed.

At 618, method 600 closes the air conditioning compressor bypass valve. Closing the air conditioning compressor bypass valve allows the air conditioning compressor to build and sustain head pressure whereas the air conditioning compressor is not allowed to build head pressure when the air conditioning compressor bypass valve is open. Thus, the air conditioning compressor applies torque to the engine after the air conditioning compressor clutch is closed so that clutch friction may be reduced. Additionally, the air conditioning system is transitioned into non-recirculation mode from recirculation mode. Method 600 proceeds to exit after the air conditioning compressor bypass valve is closed.

At 620, method 600 judges if air conditioning compressor head pressure is greater than (G.T.) a second threshold pressure, the second threshold pressure less than the first threshold pressure described at 606. If method 600 judges that air conditioning compressor head pressure is greater than the second threshold pressure, the answer is yes and method 600 proceeds to 622. Otherwise, the answer is no and method 600 proceeds to 624. In other words, if the air conditioning compressor clutch is close to being disengaged due to high air conditioning compressor head pressure, the air conditioning clutch may be disengaged earlier to improve vacuum.

At 622, method 600 opens the air conditioning compressor clutch to declutch the air conditioning compressor from the engine. Opening the air conditioning compressor clutch when air conditioning compressor head pressure is greater than the second threshold pressure allows residual pressure in the air conditioning refrigerant circuit to continue cooling the passenger cabin while the air conditioning compressor clutch is open for a threshold amount of time. The threshold amount of time may be based on an amount of time that reduces clutch degradation. Air conditioning compressor head pressure is reduced after the air conditioning compressor clutch is opened since the compressor is not operating and since the compressed refrigerant is used to cool passenger cabin air. Additionally, the air conditioning system transitions into recirculation mode (e.g., air external to the passenger cabin is not cooled and circulated in the passenger cabin or the amount of external air is reduced and the amount of passenger cabin air recirculated is increased) from non-recirculation mode (e.g., air external to the passenger cabin is cooled and circulated in the passenger cabin) in response to opening the air conditioning clutch. In this way, cooling the vehicle interior may be extended and a change in interior humidity may be less evident. Method 600 proceeds to exit after the air conditioning compressor clutch is opened.

At 624, method 600 opens the air conditioning compressor bypass valve. Opening the air conditioner compressor bypass valve reduces head pressure that may be developed by the air conditioning compressor, thereby limiting the load the air conditioning compressor applies to the engine. The engine may produce more vacuum in the engine intake manifold when the load applied to the engine is reduced since the engine may operate with less air when lighter loads are applied to the engine. Additionally, the air conditioning system transitions into recirculation mode (e.g., air external to the passenger cabin is not cooled and circulated in the passenger cabin or the amount of external air is reduced and the amount of passenger cabin air recirculated is increased) from non-recirculation mode (e.g., air external to the passenger cabin is cooled and circulated in the passenger cabin) in response to opening the air conditioning clutch. In this way, cooling the vehicle interior may be extended and a change in interior humidity may be less evident. Method 600 proceeds to 626 after the air conditioning compressor bypass valve is opened.

At 626, method 600 judges if there is a request for vacuum or some other request to cut out the air conditioning compressor. Request for vacuum and other air conditioning compressor cut outs are described at 610. If method 600 judges that a request for vacuum or other request for air conditioning compressor cut out is present, the answer is yes and method 600 returns to 624. Otherwise, the answer is no and method 600 proceeds to 628.

At 628, method 600 closes the air conditioning compressor bypass valve. Closing the air conditioning compressor bypass valve allows the air conditioning compressor to build and sustain head pressure whereas the air conditioning compressor is not allowed to build head pressure when the air conditioning compressor bypass valve is open. Thus, the air conditioning compressor applies torque to the engine after the air conditioning compressor clutch is closed so that clutch friction may be reduced. Method 600 proceeds to exit after the air conditioning compressor bypass valve is closed.

In this way, method 600 selectively reduces compressor load applied to an engine in two different ways. The air conditioning compressor clutch may mechanically disconnect the air conditioning clutch from the engine when the air conditioning compressor is deactivated for longer durations, and the air conditioning compressor bypass valve may be opened when the air conditioning compressor is deactivated for shorter durations. This approach may reduce air conditioning compressor clutch degradation and may make reductions in air conditioning compressor output less noticeable to vehicle passengers.

Thus, the method of FIG. 6 provides for a method for generating vacuum, comprising: operating an air conditioning compressor bypass valve to reduce air conditioning compressor work in response to a request to reduce air conditioning compressor load for less than a predetermined amount of time. The method includes where the air conditioning compressor bypass valve is positioned in a passage linking an inlet of a check valve to an outlet of the check valve, the check valve located at an outlet of an air conditioning compressor. The method also includes where the air conditioning compressor bypass valve is positioned in a passage linking an inlet of a check valve to an outlet of the check valve, the check valve located at an inlet of the air conditioning compressor.

In some examples, the method includes where the request to produce vacuum is based on a vacuum level of a vacuum reservoir, and further comprises transitioning an air conditioning system into a recirculation mode in response to the request to reduce air conditioning compressor load. The method includes where an air conditioning compressor is selectively coupled to an engine, and further comprising decoupling the air conditioning compressor from the engine via a clutch. The method includes where the request to reduce air conditioning compressor load for less than a predetermined amount of time is based on a stored vacuum level being less than a threshold vacuum level. The method includes where the request to reduce air conditioning compressor load for less than a predetermined amount of time if the vehicle operator's desired acceleration is higher than a threshold. The method also includes where the request to reduce air conditioning compressor load for less than a predetermined amount of time is based on an air conditioning compressor head pressure exceeding a threshold head pressure and a desired air conditioning compressor off time being less than a threshold time. The method includes where the threshold time is based on an air conditioning clutch minimum disengagement time.

The method of FIG. 6 also provides for a method for generating vacuum, comprising: operating an air conditioning compressor bypass valve to reduce air conditioning compressor work in response to a request to reduce air conditioner compressor load and air conditioner compressor head pressure being less than a threshold pressure. The method further comprises opening an air conditioning compressor clutch in response to the request to reduce air conditioning compressor load and air conditioning compressor head pressure being greater than the threshold pressure. The method includes where the request to reduce air conditioning compressor load is based on an engine being at idle speed. The method includes where the air conditioning compressor bypass valve is opened in response to the request to reduce air conditioning compressor load and closed in response to a vacuum level stored in a vacuum reservoir being greater than a threshold vacuum level. The method also includes where refrigerant flows through the air conditioning compressor bypass valve.

As will be appreciated by one of ordinary skill in the art, routines described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for generating vacuum, comprising:
operating an air conditioning compressor bypass valve to reduce air conditioning compressor work in response to a request to reduce air conditioning compressor load for less than a predetermined amount of time, where an air conditioning compressor is selectively coupled to an engine, and decoupling the air conditioning compressor from the engine via a clutch.

2. The method of claim 1, where the air conditioning compressor bypass valve is positioned in a passage linking an inlet of a check valve to an outlet of the check valve, the check valve located at an outlet of the air conditioning compressor.

3. The method of claim 1, where the air conditioning compressor bypass valve is positioned in a passage linking an inlet of a check valve to an outlet of the check valve, the check valve located at an inlet of the air conditioning compressor.

4. The method of claim 1, where a request to produce vacuum is based on a vacuum level of a vacuum reservoir, and further comprising transitioning an air conditioning system into a recirculation mode in response to the request to reduce air conditioning compressor load.

5. The method of claim 1, where the request to reduce air conditioning compressor load for less than a predetermined amount of time is based on a stored vacuum level being less than a threshold vacuum level.

6. The method of claim 1, where the request to reduce air conditioning compressor load for less than a predetermined amount of time is based on vehicle acceleration being less than a threshold acceleration level.

7. The method of claim 1, where the request to reduce air conditioning compressor load for less than a predetermined amount of time is based on an air conditioning compressor head pressure exceeding a threshold head pressure and a desired air conditioning compressor off time being less than a threshold time.

8. The method of claim 7, where the threshold time is based on an air conditioning clutch minimum disengagement time.

9. A method for generating vacuum, comprising:
operating an air conditioning compressor bypass valve to reduce air conditioning compressor work in response to a request to reduce air conditioning compressor load and air conditioning compressor head pressure being less than a threshold pressure, where the request to reduce air conditioning compressor load is based on an engine being at idle speed.

10. The method of claim 9, further comprising opening an air conditioning compressor clutch in response to the request to reduce air conditioning compressor load and air conditioning compressor head pressure being greater than the threshold pressure.

11. The method of claim 9, where the air conditioning compressor bypass valve is opened in response to the request to reduce air conditioning compressor load and closed in response to a vacuum level stored in a vacuum reservoir being greater than a threshold vacuum level.

12. The method of claim 9, where refrigerant flows through the air conditioning compressor bypass valve.

13. A system for generating vacuum, comprising:
an engine including an intake manifold;
an air conditioning compressor;
a first check valve at an inlet of the air conditioning compressor;
a second check valve at an outlet of the air conditioning compressor;
an air conditioning compressor clutch selectively coupling the engine and the air conditioning compressor; and
an electrically operated air conditioning compressor bypass valve located at the inlet or outlet of the air conditioning compressor.

14. The system of claim 13, further comprising a controller and executable instructions stored in non-transitory memory for operating the electrically operated air conditioning compressor bypass valve in response to a vacuum level of a vacuum reservoir.

15. The system of claim 14, further comprising the air conditioning compressor clutch and additional executable instructions for opening the air conditioning compressor clutch in response to the vacuum level stored in the vacuum reservoir.

16. The system of claim 15, further comprising additional instructions for not closing the air conditioning compressor clutch for a predetermined amount of time since the air conditioning compressor clutch has opened.

17. The system of claim 13, where the electrically operated air conditioning compressor bypass valve is located in a passage linking an inlet of the first check valve and an outlet of the first check valve.

18. The system of claim 13, where the electrically operated air conditioning compressor bypass valve is located in a passage linking an inlet of the second check valve and an outlet of the second check valve.

* * * * *